United States Patent [19]

Rempel et al.

[11] 4,430,038
[45] Feb. 7, 1984

[54] POWER DUMP WAGON

[75] Inventors: William Rempel; Henry Rempel, both of Winnipeg, Canada

[73] Assignee: Greenbelt Farm Systems Inc., Winnipeg, Canada

[21] Appl. No.: 201,172

[22] Filed: Oct. 27, 1980

[30] Foreign Application Priority Data

Nov. 1, 1979 [CA] Canada ............................ 338944

[51] Int. Cl.³ .............................................. B60P 1/34
[52] U.S. Cl. .................................. 414/346; 414/471; 414/497; 414/528; 298/11; 298/18; 298/23 C; 298/23 MD
[58] Field of Search ............... 414/346, 471, 491, 528; 298/11, 18, 23 C, 23 MP

[56] References Cited

U.S. PATENT DOCUMENTS

| 3,753,593 | 8/1973 | Wells | 298/18 X |
| 3,844,615 | 10/1974 | Anderson | 298/23 C |
| 3,844,617 | 10/1974 | Kostman | 414/346 X |
| 3,913,760 | 10/1975 | Koral | 414/528 |
| 4,072,242 | 2/1978 | Cook | 414/528 X |

FOREIGN PATENT DOCUMENTS 2812726 10/1949 Fed. Rep. of Germany ...... 414/346

Primary Examiner—Richard A. Schacher
Attorney, Agent, or Firm—Stanley G. Ade

[57] ABSTRACT

A chassis supports a main frame with one open side, and a dump box with an open upper side is situated within the main frame and pivoted to the other side of the main frame. An hydraulic piston and cylinder assembly can move the box from the vertical or normal position to a tilted or unloading position. The dump box is pivoted to the upper side of the main frame at a line spaced from the top side edge of the dump box so that the top side edge extends beyond the side of the wagon when tipped or tilted. A conveyor is situated on the side of the dump box which is pivoted to the main frame and driven by an hydraulic motor. Material is loaded in the open upper side of the dump box and when it is to be unloaded, the dump box is tilted whereupon the conveyor unloads the material from the open upper side of the dump box. This construction overcomes disadvantages of conventional dump boxes in which the center of gravity is shifted considerably when dumping by gravity, particularly when the load is such that it resists sliding movement during dumping. Furthermore, conventional dump boxes are usually pivoted adjacent the top edge thereof which dumps the load close to the side of the receptacle into which it is being dumped rather than towards the center as with the present device due to the fact that the upper edge of the box is spaced away from the chassis.

13 Claims, 7 Drawing Figures

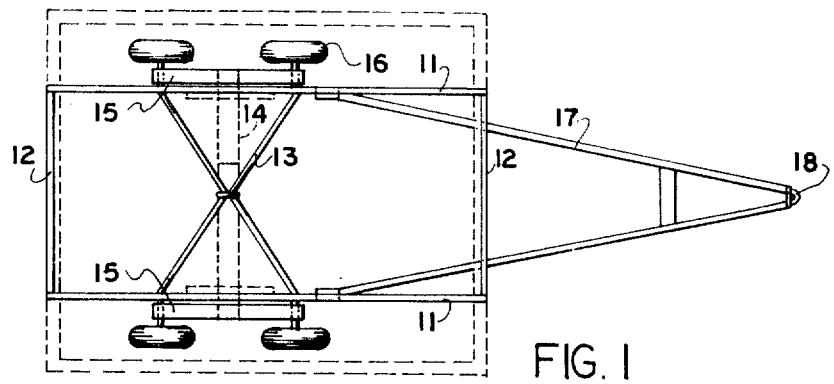
FIG. 1
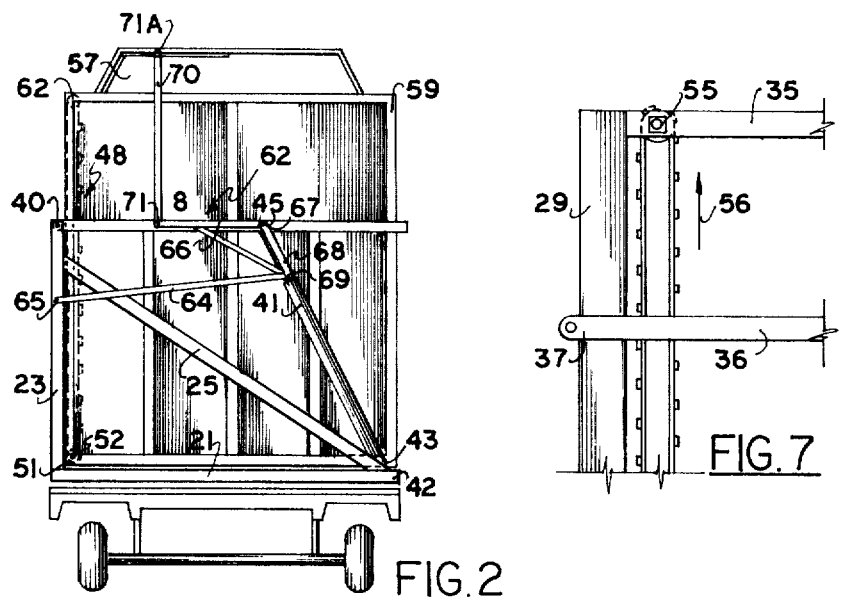
FIG. 2
FIG. 7
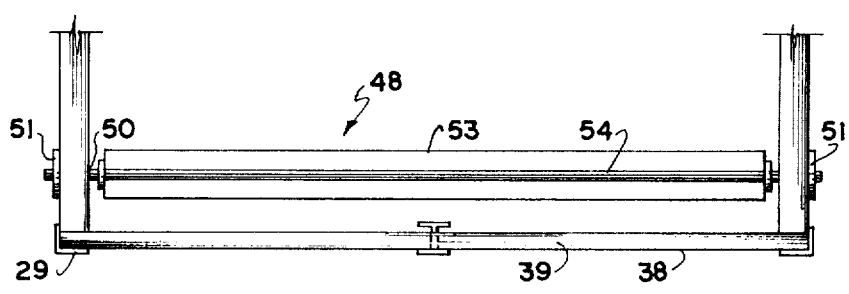
FIG. 6

POWER DUMP WAGON

BACKGROUND OF THE INVENTION

This invention relates to new useful improvements in power dump wagons and although it is designed primarily for use with conventional forage harvesters to accumulate the crop in the normal way, nevertheless it can be used for any other such materials which need to be unloaded from the dump wagon from time to time.

Conventional dump boxes or wagons are normally pivoted adjacent the upper side edge thereof and unloaded by gravity when the box is tilted. This means that the dump wagon or box has to be tilted to a considerable degree which often incurs a dangerous shift of the center of gravity. This is particularly so when wet silage or wet material is loaded as this material tends to hold together and not separate from the dump box until it is tilted to a dangerous degree whereupon it tends to dump all at once which can often damage the vehicle into which it is being dumped by overloading the springs and the like.

Another disadvantage of conventional dump wagons is the fact that because they are hinged adjacent the top edge thereof, the load tends to be dumped to one side of the vehicle into which it is being loaded causing uneven loading or the necessity of hand shifting the material in order to spread same across the vehicle body.

The device is designed for use behind a towing vehicle such as a forage harvester and is connected thereto by means of a conventional hitch assembly.

SUMMARY OF THE INVENTION

The present invention overcomes disadvantages inherent with current designs by the provision of a full width conveyor situated on the side wall by which the dump box is hinged to the supporting structure so that it need only be tilted approximately 45° whereupon the conveyor removes the material from the dump wagon to the receiving vehicle.

In accordance with the invention there is provided a power dump wagon comprising in combination a supporting main frame, a dump wagon box mounted within said main frame, means for mounting said box by one side thereof within said main frame for tilting movement relative thereto, from a substantially vertical, normal position to an inclined unloading position and vice versa, an unloading conveyor operatively mounted upon said one side of said box and extending substantially the full length and breadth thereof, means to move said box from one position to the other and further means to operate said conveyor.

Another advantage of the present invention is that the pivot line may be positioned spaced from the upper edge of the box so that when in the tilted position, the discharge point extends approximately 3 feet overboard thereby permitting the load to be dumped in approximately the center of the receiving wagon rather than on one side thereof.

Another advantage of the present invention is that it can be unloaded with virtually no shift in the center of gravity and, due to the provision of the conveyor on one side, full unloading is readily accomplished.

A yet further advantage of the present invention is that unloading can take place even although the material may tend to stick or lump together thereby preventing sudden dumping of the load.

A yet further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is top plan view of the preferred chassis assembly per se.

FIG. 2 is a rear view of the complete assembly showing the dump box in the vertical or normal position.

FIG. 6 is a fragmentary front view of the conveyor side of the dump wagon box.

FIG. 7 is a fragmentary end elevation of the conveyor side of the dump wagon box.

In the drawings like characters of reference indicate corresponding parts in the different figures.

DETAILED DESCRIPTION

Figure 3:
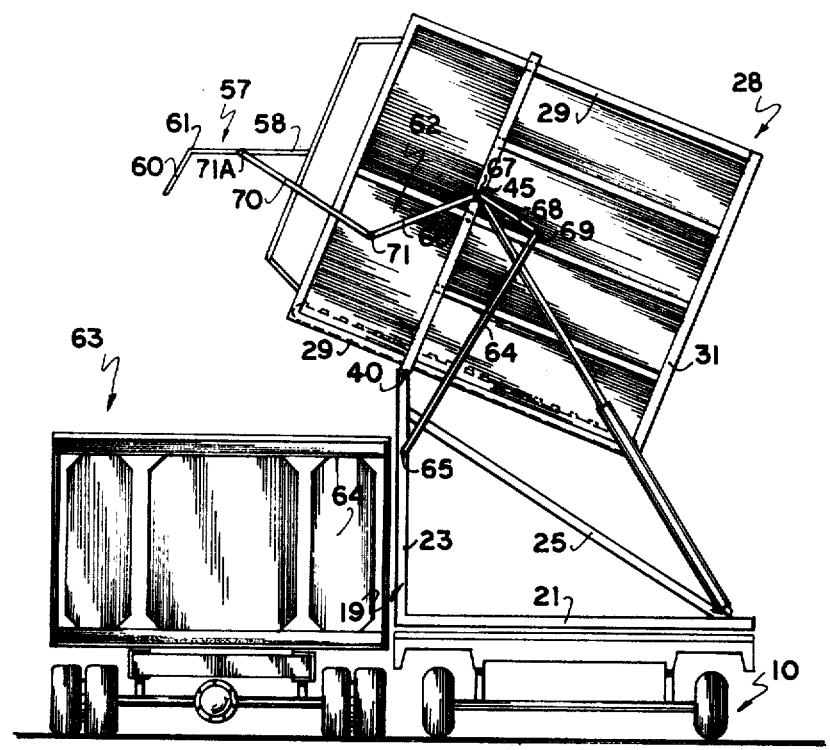
FIG. 3 is a view similar to FIG. 2 showing the dump box in the unloading position.

Proceeding therefore to describe the invention in detail, reference character 10 illustrates in general, the preferred form of chassis which is substantially rectangular and comprises spaced and parallel longitudinal chassis members 11, transverse end members 12, and diagonal brace members 13.

In the preferred embodiment, the main support axle 14 supports walking beams 15 on each end thereof which in turn carry ground engaging wheels 16 all of which is conventional, and a hitch assembly 17 extends forwardly from the chassis 10 terminating in a hitch 18 which is also conventional.

Mounted upon the chassis is a supporting main frame collectively designated 19. In this embodiment it includes spaced and parallel longitudinally extending base members 20 and a plurality of cross members 21 extending therebetween, it being understood that this base frame comprised of the members 20 and 21, is secured to the chassis by conventional means (not illustrated).

Figure 4:
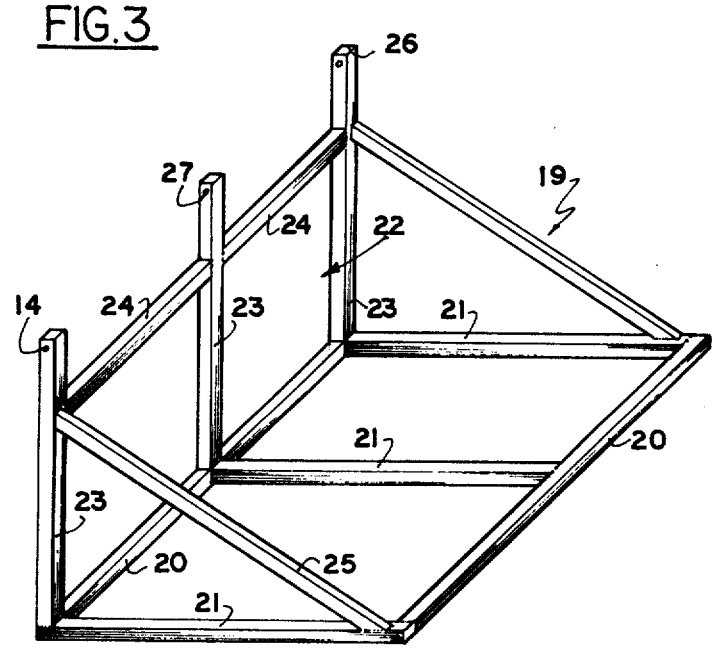
FIG. 4 is an isometric view of the main frame per se.

A vertical support frame collectively designated 22 extends upwardly from one longitudinal chassis member 20 and includes a plurality of vertical supports 23, horizontal braces 24 and diagonal end braces 25 clearly shown in FIG. 4 and it will be noted that the upper ends 26 of the vertical members 23, are provided with transverse drillings 27 which act as hinge points as will hereinafter be described.

Figure 5:
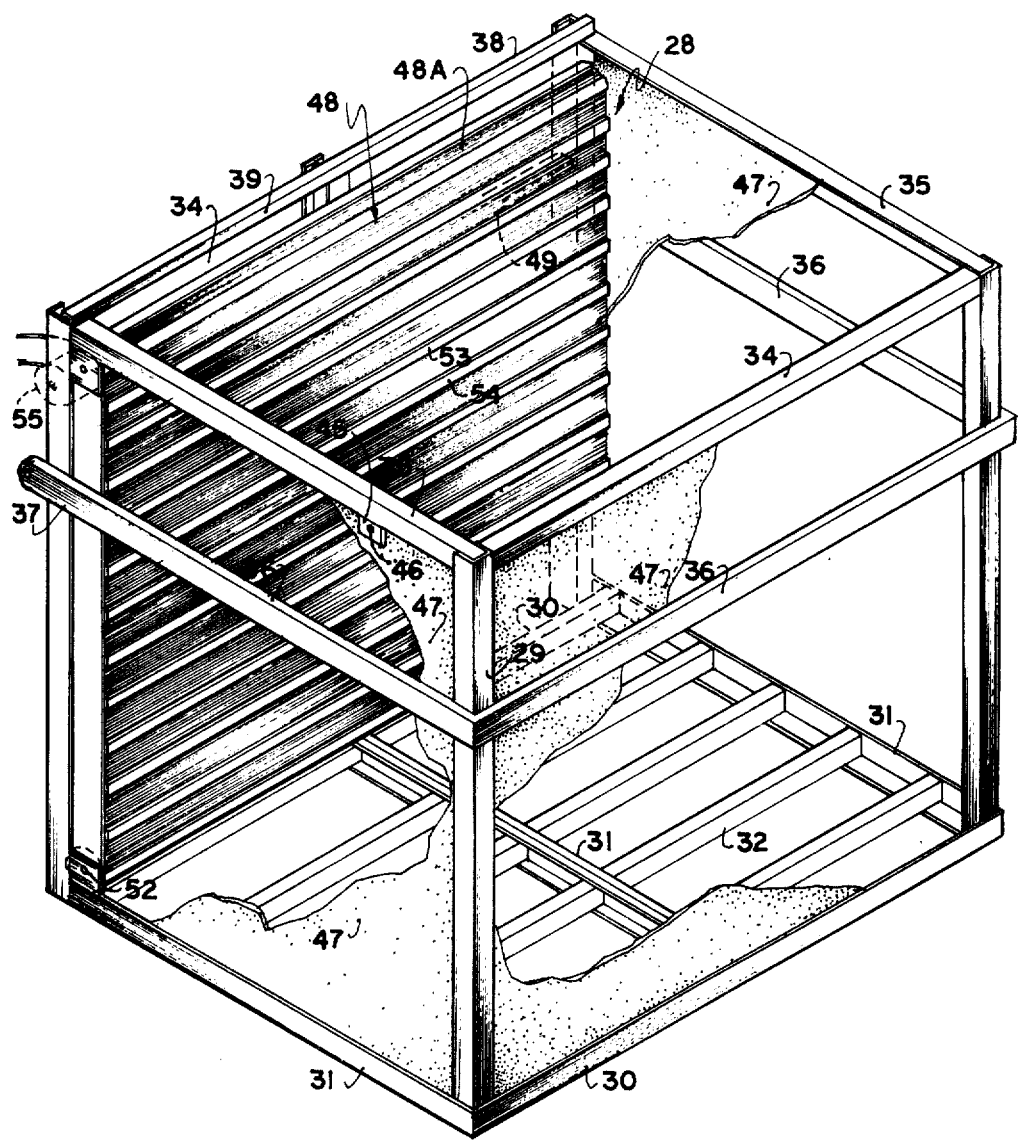
FIG. 5 is a partially broken away isometric view of the dump wagon box per se.

FIG. 5 shows the dump wagon box collectively designated 28. It consists of vertical corner members 29, longitudinal base members 30, transverse brace members 31 and space stringers 32. Upper longitudinal members 34 extend between the upper ends of the vertical members 29 and upper transverse members 35 complete the enclosure. Braces 36 extend around the vertical members 29 spaced from the upper ends thereof and pairs of hinge plates 37 are secured to the ends of these horizontal braces 36 and extend from the lefthand side 38 of the dump wagon box with reference to FIG. 5 and it will be noted that these hinge plates 37 are spaced downwardly from the upper horizontal side edge 39 approximately one third of the height of the vertical membe 29. Pivot pins 40 engage through these hinge plates and through the transverse drillings 37 thus hinging the dump box 28 to the lefthand side of the frame 19 with reference to FIG. 4.

A fluid operator taking the form of a piston and cylinder assembly 41 is provided at each end of the device, each one being pivoted by the lower end of the cylinder thereof, to the lower righthand corner 42 of the frame, with reference to FIG. 2, reference character 43 illustrating the pivotal connection.

The piston rods 44 are in turn pivotally connected to lugs or plates 45 secured to the transverse bracket members 36 of the box 28 and reference character 46 illustrates the pivotal connection of the piston rod to these plates.

The base of the dump wagon box together with the two ends and the righthand side with reference to FIG. 5, are preferably covered with sheet metal illustrated by reference character 47 to form a smooth enclosure. However the lefthand side 39 (with reference to FIG. 5) is provided with a conveyor collectively designated 48 and this lefthand side wall is braced by stringers 49 in a manner similar to the floor stringers 32, in order to give sufficient strength to this side wall and to support the conveyor 48.

An upper conveyor roller 50 is journalled for rotation between bearings 51 secured to the upper transverse members 35 and adjacent the lefthand wall 39. A lower conveyor roller 52 is similarly supported within bearings 51 situated on the lower end transverse members 31 once again adjacent the lefthand wall 39 and an endless canvas 53 extends around these rollers and is provided with spaced and parallel transverse slats 54 which are of course conventional.

A source of power is provided for the conveyor and preferably takes the form of an hydraulic motor illustrated schematically by reference character 55 and drives the conveyor so that the inner run thereof travels in the direction of arrow 56, namely, from the floor of the dump wagon box towards the open upper side of the side wall 39.

It is desirable but not essential that a cover 57 be provided to cover the open upper side of the dump wagon box, particularly on the side on which the conveyor assembly 48 is situated, and in the present embodiment, the major portion 58 of the dump wagon box ends is parallel to the base with the outer portions inclining outwardly and downwardly therefrom. The cover 57 includes the first panel portion 58 hinged substantially centrally between the upper edges of the upper transverse members 35 as at 59 and a second panel portion 60 which extends outwardly and downwardly from the front edge of the panel 58 along the line 61 and engages the upper contour of the ends of the dump wagon box, when closed as shown in FIG. 2.

Linkage 62 opens and closes the cover 57 as the box is moved from the position of FIG. 2 to the position of FIG. 3 and vice versa as will hereinafter be described.

The fluid operators 41 are operatively connected to a source of hydraulic power (not illustrated) available from the prime mover and in operation, the device is in the normal or vertical position illustrated in FIG. 2. Material such as silage or forage, is loaded into the dump wagon box from the forage harvester (not illustrated) in the usual manner, through loading opening 62A formed in the upper side of the front end 47A.

When it is desired to unload same, the fluid operators 41 are extended thus pivoting the box around the pivot pins 40 to substantially the position illustrated in FIG. 3 and it will be noted that the center of gravity has shifted very little at this point. The conveyor 48 is then actuated which moves the material from the interior of the dump wagon box and dumps same over the upper edge of the wall 39 into the adjacent vehicle illustrated in phantom by reference character 63 in FIG. 3 and it will be noted that the upper end 48A of the conveyor is situated spaced inwardly from the adjacent side 64 of the vehicle receiving the load so that the material is dumped towards the center of the vehicle rather than on one side thereof.

The aforementioned linkage 62, includes a first link 64 pivoted by one end by means of pivot pin 65, to the outermost vertical members 23 of the frame 19.

An intermediate crank arm 66 is pivoted intermediate the ends thereof by means of pivot pin 67, to intermediate the ends of cross member 36 of the frame for the dump box. The end 68 of the crank arm is pivotally connected by means of pivot pin 69 to the other end of the first link 64. A third or outer link 70 is pivotally connected by means of pivot pin 71 to the distal end of the crank arm 66, by one end thereof and by the other end thereof, by means of pivot pin 71, to the cover 57 intermediate the ends of the panel 58. There is a linkage systen at either end of the forage box although only one is shown.

As the forage box is moved from the position shown in FIG. 2 to the position shown in FIG. 3, the linkage opens the cover as shown in FIG. 3 and when the forage box is lowered to the substantially vertical position shown in FIG. 2, the linkage closes the cover to the position shown in FIG. 2.

The conveyor unloads the material regardless of its condition and whether or not it is lumped together thus preventing a sudden dumping of the material which normally occurs when such material is dumped by gravity as is normal.

The open side of the supporting frame permits the tipping of the box of the position shown in FIG. 3.

The present device allows collection and unloading of part loads or full loads and because of the provision of the conveyor 28, a relatively large box can be provided sufficient to hold material which will substantially fill a receiving vehicle such as that illustrated by reference character 63.

Since various modifications can be made in our invention as hereinabove described and many apparently widely different embodiments of same made within the spirit and scope of the claims without departing from such spirit and scope, it is intended that all matter contained in the accompanying specification shall be interpreted as illustrative only and not in a limiting sense.

What we claim as our invention:

1. A power dump wagon comprising in combination a supporting main frame, a dump wagon box mounted within said main frame, means for mounting said box by one side thereof within said main frame for tilting movement relative thereto, from a substantially vertical, normal position to an inclined uploading position and vice versa, an endless unloading conveyor operatively mounted upon said one side of said box and extending substantially the full length and breadth thereof, said unloading conveyor being substantially vertical when said box is in the said normal position, and including an outer run and an inner run spaced and parallel with said outer run and situated between said outer run and said one side, means to move said box from one position to the other and further means to operate said conveyor wherein said outer run moves upwardly from adjacent the lower end of said one side towards the upper end thereof.

2. The dump wagon according to claim 1 in which said box is mounted by said one side thereof for tilting movement about a line spaced downwardly from the top of said box whereby said top is spaced from said main frame when in the unloading position.

3. The dump wagon according to claim 1 in which said box includes an open top and detachable cover means for said top.

4. The dump wagon according to claim 2 in which said box includes an open top and detachable cover means for said top.

5. A power dump wagon according to claim 1 in which said main frame includes an open side opposite to the side of said main frame within which said box is mounted for tilting movement.

6. A power dump wagon according to claim 2 in which said main frame includes an open side opposite to the side of said main frame within which said box is mounted for tilting movement.

7. A power dump wagon according to claim 3 in which said main frame includes an open side opposite to the side of said main frame within which said box is mounted for tilting movement.

8. A power dump wagon according to claim 4 in which said main frame includes an open side opposite to the side of said main frame within which said box is mounted for tilting movement.

9. The dump wagon according to claims 1, 2 or 3 in which said means to move said box from one position to the other comprises at least one fluid operator operatively extending between said box and said main frame, and said means to operate said conveyor comprises an hydraulic motor operatively connected to said conveyor.

10. The dump wagon according to claims 3, 4 or 5 in which said means to move said box from one position to the other comprises at least one fluid operator operatively extending between said box and said main frame, and said means to operate said conveyor comprises an hydraulic motor operatively connected to said conveyor.

11. The dump wagon according to claims 6, 7 or 8 in which said means to move said box from one position to the other comprises at least one fluid operator operatively extending between said box and said main frame, and said means to operate said conveyor comprises an hydraulic motor operatively connected to said conveyor.

12.

The dump wagon according to claims 3, 4 or 7 in which said means to move said box from one position to the other comprises at least one fluid operator operatively extending between said box and said main frame, and said means to operate said conveyor, comprises an hydraulic motor operatively connected to said conveyor, and linkage means operatively extending between said main frame, said box and said cover means whereby said cover means opens when said box is moved from the vertical normal position to the inclined unloading position and vice versa.

13. The dump wagon according to claim 8 in which said means to move said box from one position to the other comprises at least one fluid operator operatively extending between said box and said main frame, and said means to operate said conveyor, comprises an hydraulic motor operatively connected to said conveyor, and linkage means operatively extending between said main frame, said box and said cover means whereby said cover means opens when said box is moved from the vertical normal position to the inclined unloading position and vice versa.

* * * * *